April 26, 1932.  A. GRAENZ  1,856,053
KNITTED FABRIC AND METHOD OF MAKING THE SAME
Filed Oct. 8, 1931    10 Sheets-Sheet 1

INVENTOR
Alfred Graenz
BY
Gifford, Scull & Burgess
ATTORNEYS.

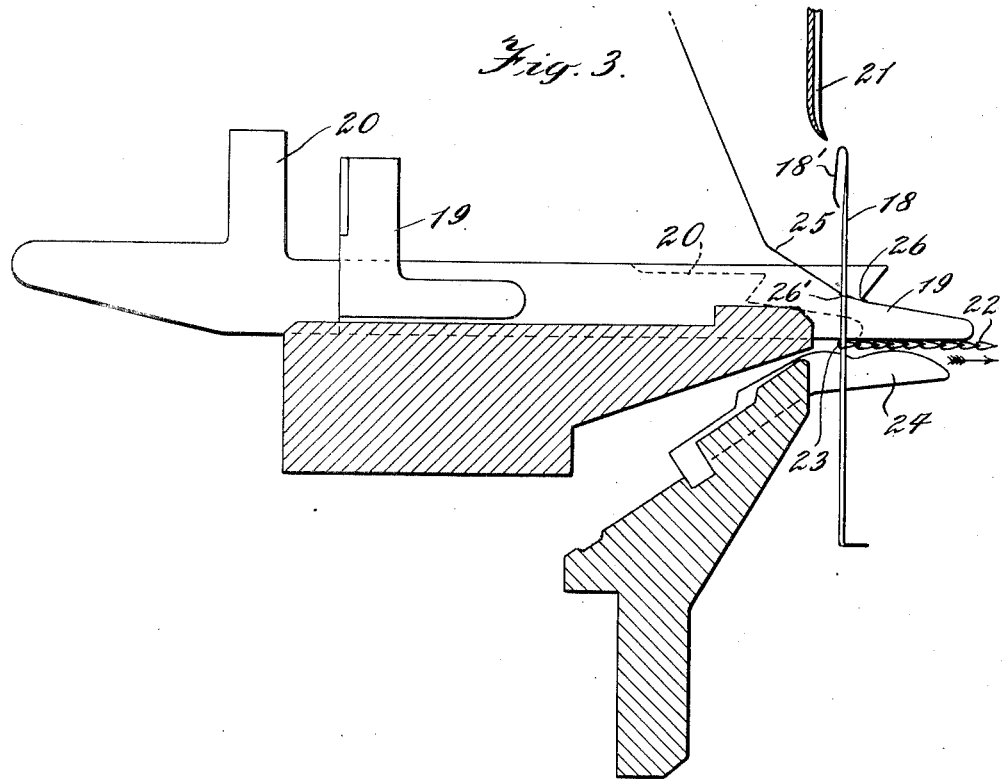
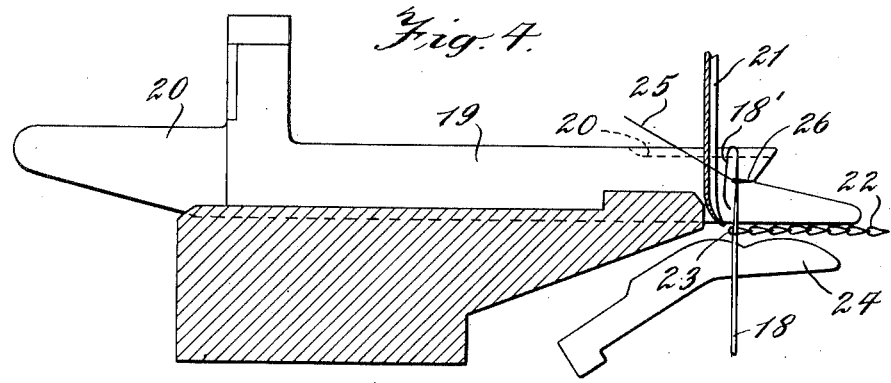

April 26, 1932.　　　　　A. GRAENZ　　　　　1,856,053
KNITTED FABRIC AND METHOD OF MAKING THE SAME
Filed Oct. 8, 1931　　10 Sheets-Sheet 3

INVENTOR
Alfred Graenz
BY
Gifford, Scull & Burgess
ATTORNEYS

April 26, 1932.  A. GRAENZ  1,856,053
KNITTED FABRIC AND METHOD OF MAKING THE SAME
Filed Oct. 8, 1931  10 Sheets-Sheet 4
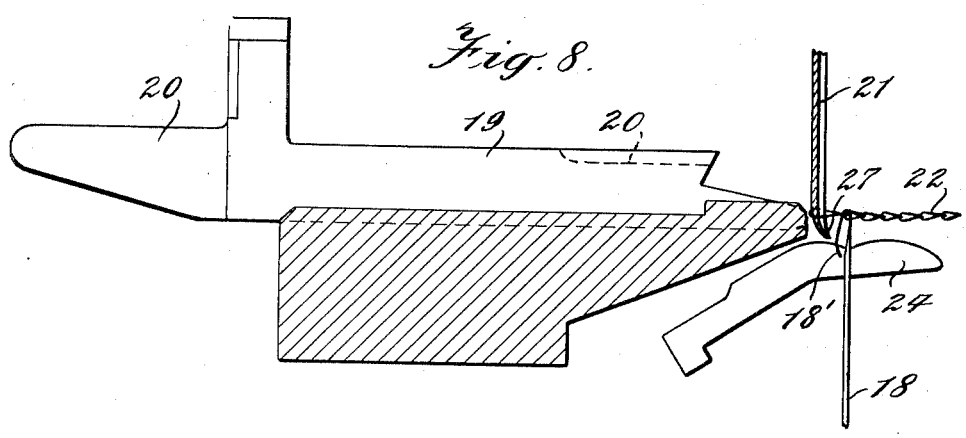
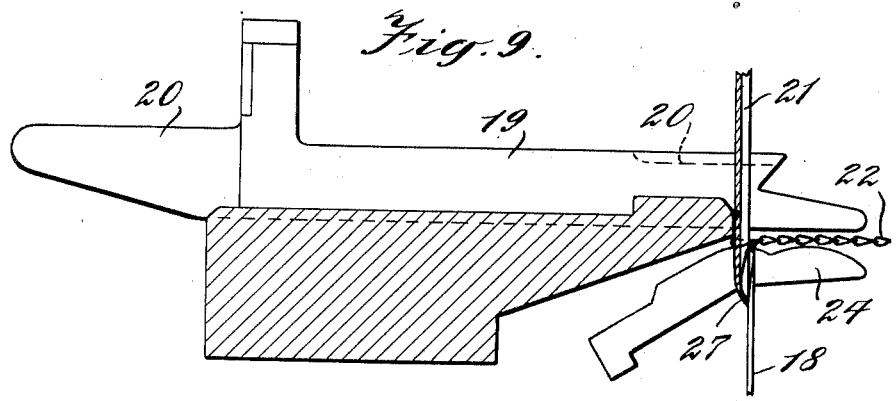
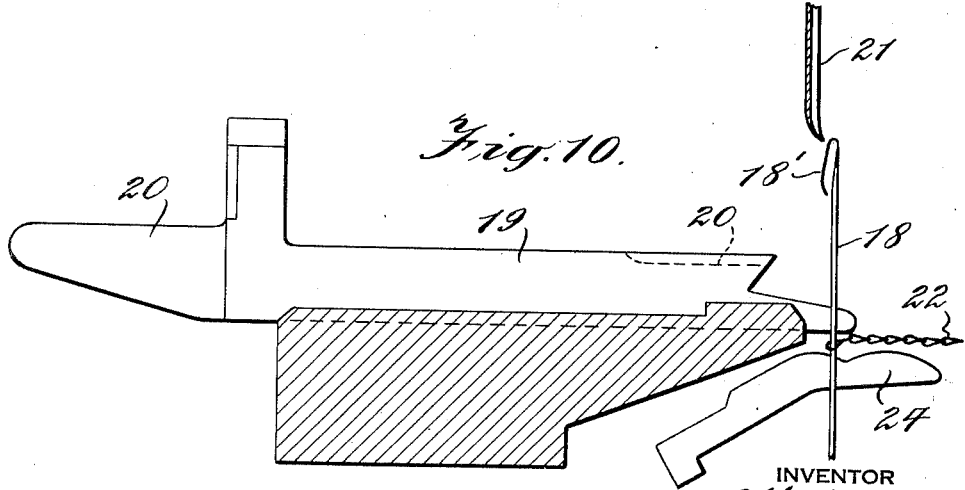
INVENTOR
Alfred Graenz
BY
Gifford, Scull & Burgess
ATTORNEYS April 26, 1932.  A. GRAENZ  1,856,053
KNITTED FABRIC AND METHOD OF MAKING THE SAME
Filed Oct. 8, 1931  10 Sheets-Sheet 5
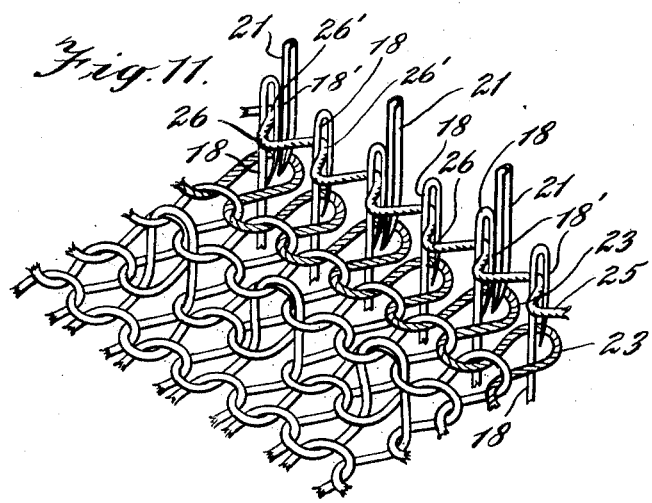
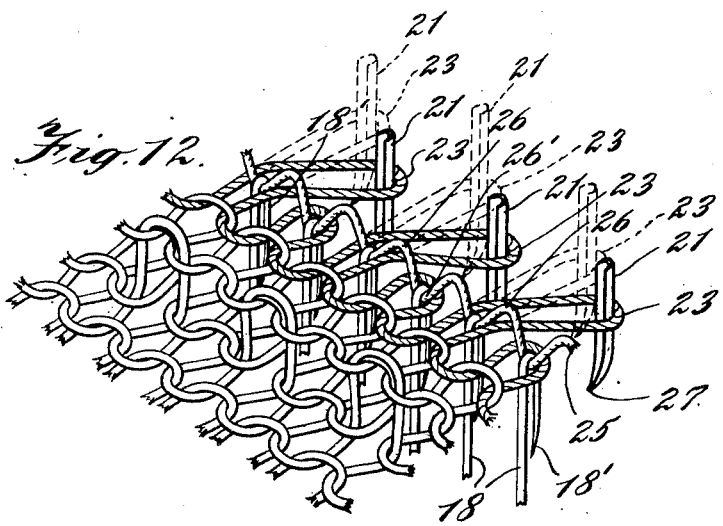
INVENTOR
Alfred Graenz
BY
Gifford, Scull & Burgess
ATTORNEYS April 26, 1932.  A. GRAENZ  1,856,053
KNITTED FABRIC AND METHOD OF MAKING THE SAME
Filed Oct. 8, 1931   10 Sheets-Sheet 6
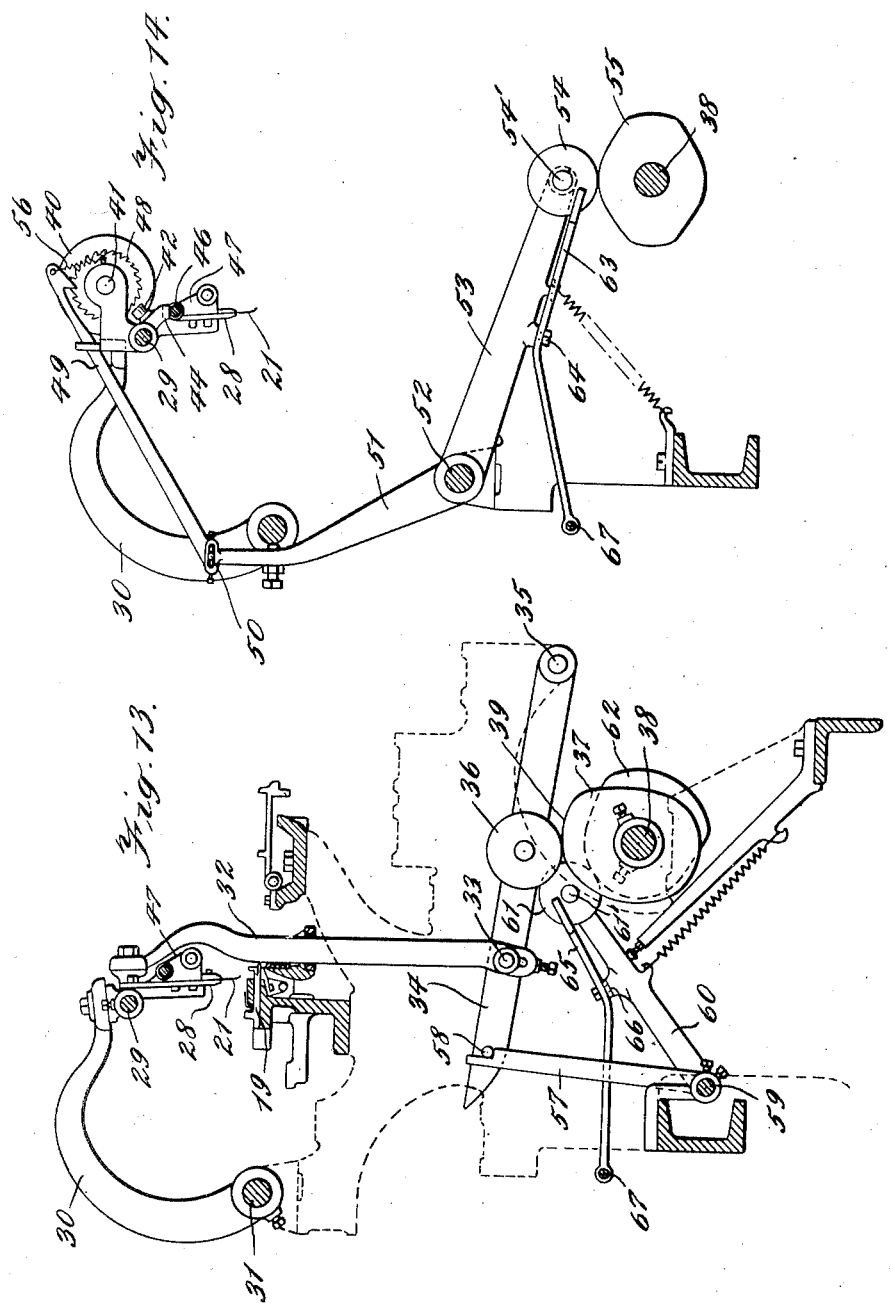
INVENTOR
Alfred Graenz
BY
Gifford, Scull & Burgess
ATTORNEYS April 26, 1932. A. GRAENZ 1,856,053
KNITTED FABRIC AND METHOD OF MAKING THE SAME
Filed Oct. 8, 1931 10 Sheets-Sheet 7
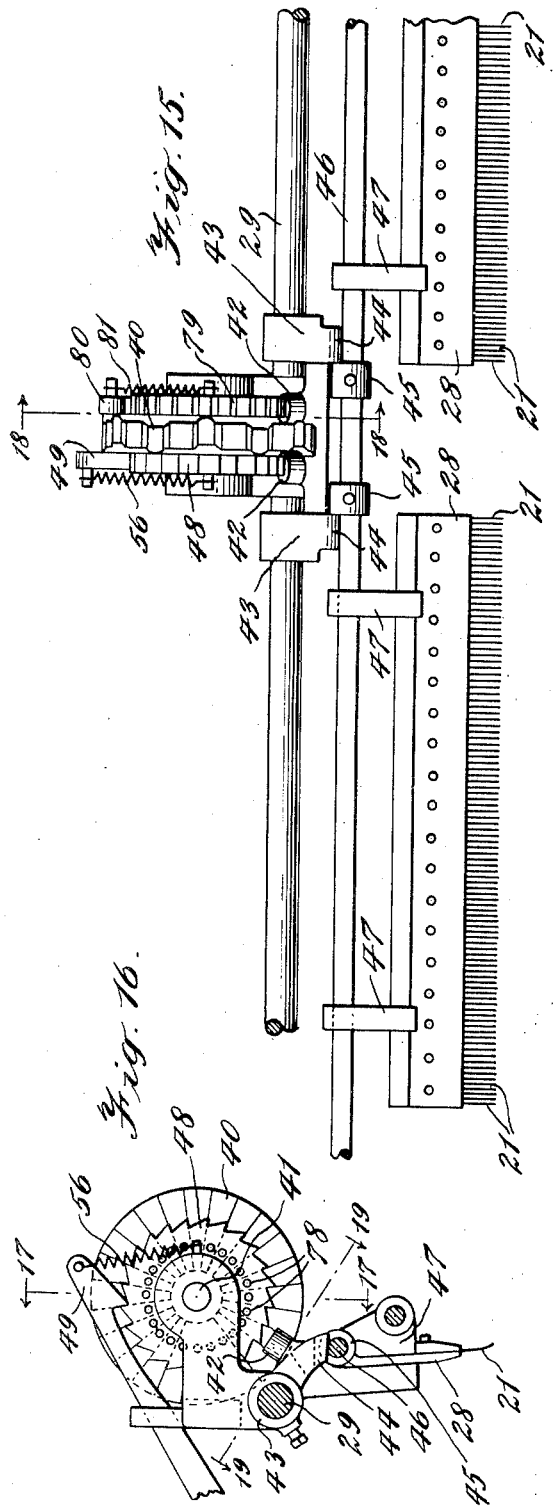
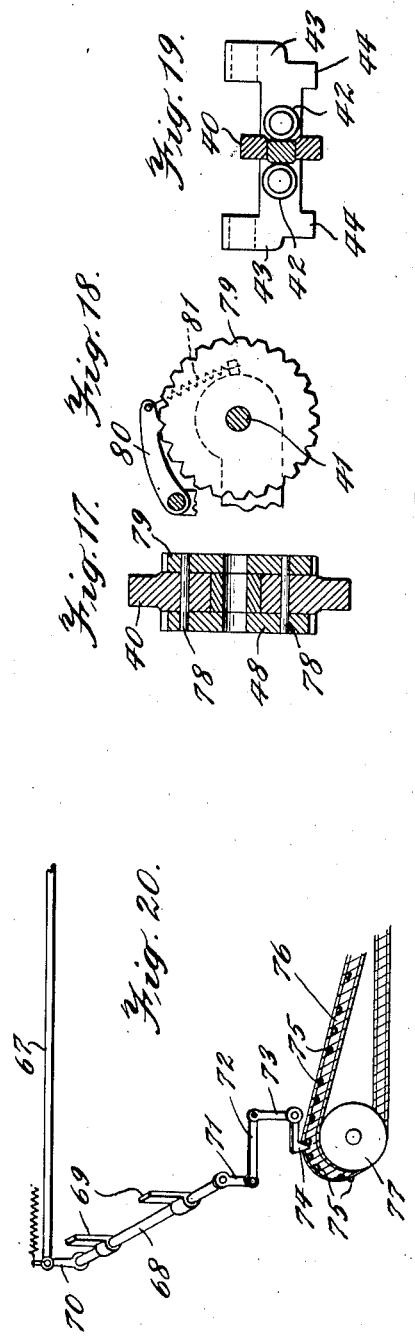
INVENTOR
Alfred Graenz
BY
Gifford, Scull & Burgess
ATTORNEYS.

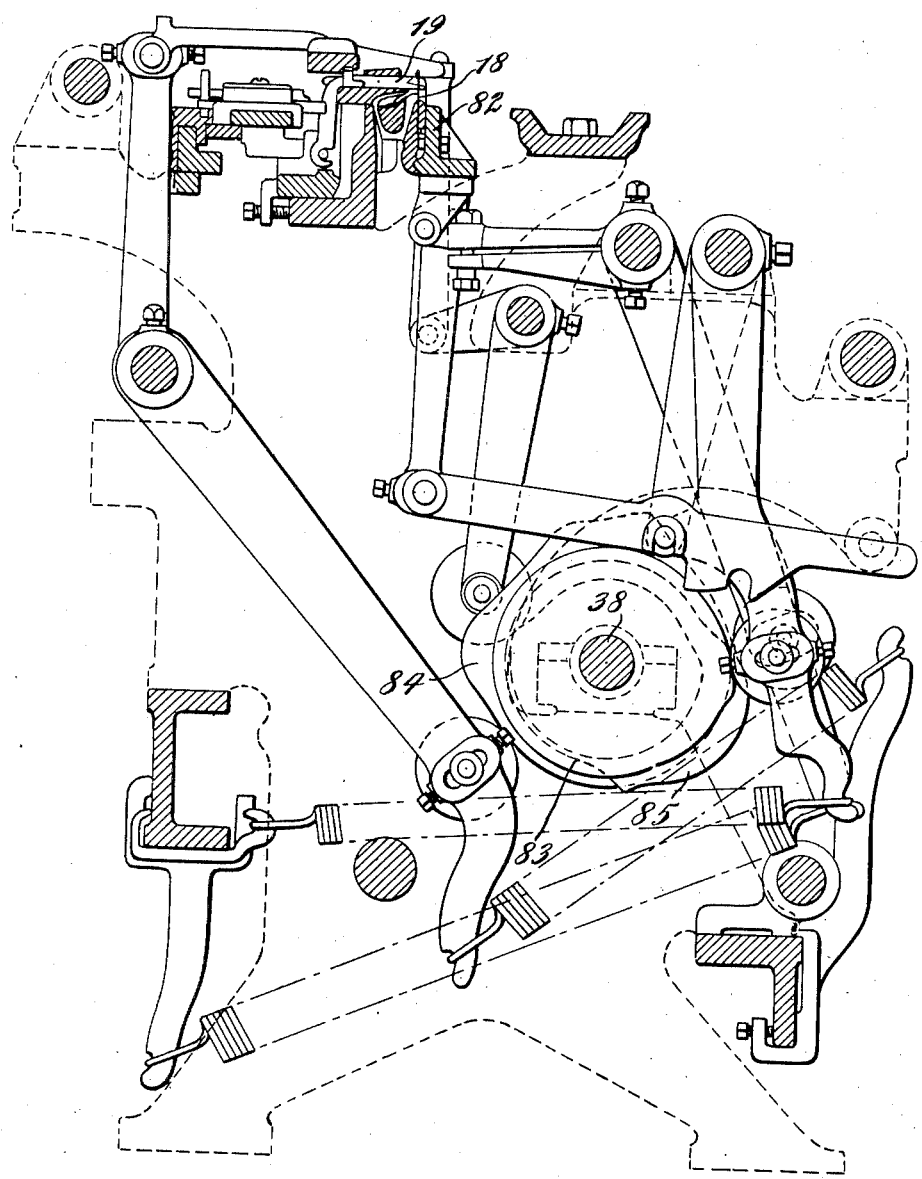

April 26, 1932.  A. GRAENZ  1,856,053
KNITTED FABRIC AND METHOD OF MAKING THE SAME
Filed Oct. 8, 1931  10 Sheets-Sheet 9
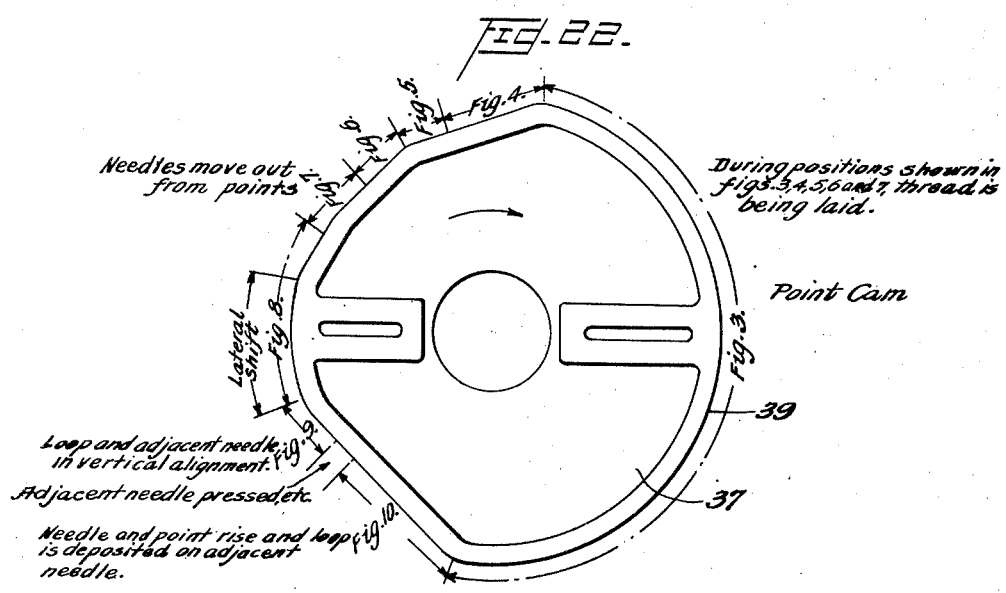
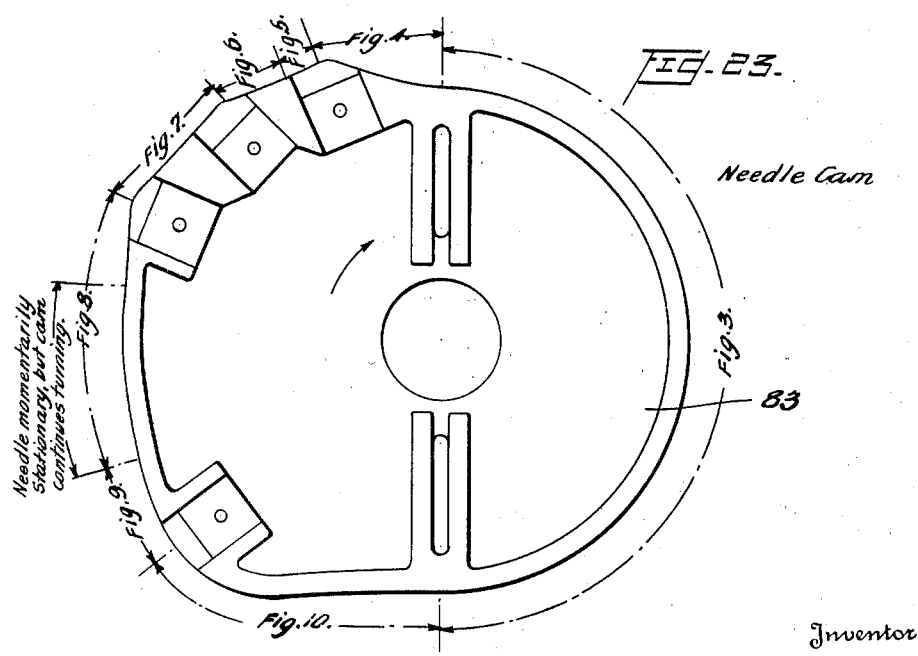

April 26, 1932.  A. GRAENZ  1,856,053
KNITTED FABRIC AND METHOD OF MAKING THE SAME
Filed Oct. 8, 1931  10 Sheets-Sheet 10

Needle Movement

Point Movement
End View

Point Movement
Front View

Inventor
Alfred Graenz
By Gifford, Scull & Burgess
Attorney

Patented Apr. 26, 1932

1,856,053

UNITED STATES PATENT OFFICE

ALFRED GRAENZ, OF PHILADELPHIA, PENNSYLVANIA, ASSIGNOR TO MILLER HOSIERY CO., INC., OF NEW YORK, N. Y., A CORPORATION OF NEW YORK

KNITTED FABRIC AND METHOD OF MAKING THE SAME

Application filed October 8, 1931. Serial No. 567,555.

This invention relates to a novel and improved knitted fabric, more particularly of the full-fashioned type, and to a novel method of making the same, the novel features of which will be best understood from the following description and the annexed drawings, in which I have illustrated selected embodiments of the novel fabric and also selected embodiments of a mechanism which may be used in connection with one method of making the fabric.

Referring to the drawings, Fig. 1 is a view on an exaggerated scale showing one form of stitch which may be used in making the fabric.

Fig. 2 is a view similar to Fig. 1, but showing a different arrangement of stitches which may be employed.

Figs. 3 to 10, inclusive, are diagrammatic views in the form of sections through the sinker head and associated mechanism and showing successive steps in the practice of one method which may be used in making a fabric similar to what is shown in Figs. 1 and 2, Figure 7 being taken upon a section line through the wale of loops, adjoining the wale through which the preceding Figures 3-6 are taken.

Figs. 11 and 12 are diagrammatic views in perspective showing the relation of the different loops of the fabric to each other during the formation of certain stitches.

Fig. 13 is a vertical transverse section through one form of knitting machine illustrating one method of giving one of the necessary movements performed in practicing the invention.

Fig. 14 is a view similar to Fig. 13, but taken on a different plane parallel to that of Fig. 13 and illustrating one form of mechanism which may be used in giving another movement which cooperates with the movement caused by the mechanism of Fig. 13.

Fig. 15 is a view on an enlarged scale and taken from the right of Fig. 14, showing the mechanism appearing in the upper part of that figure.

Fig. 16 is a view on an enlarged scale taken on the same plane as that of Fig. 14 and showing certain parts appearing in that figure.

Fig. 17 is a section on the line 17—17 of Fig. 16.

Fig. 18 is a section on the line 18—18 of Fig. 15.

Fig. 19 is a section on the line 19—19 of Fig. 16.

Fig. 20 is a diagrammatic view showing the control means for some of the mechanism illustrated in the other figures.

Fig. 21 is a view taken on a plane parallel to the planes of Figs. 13 and 14 and showing the mechanism for operating the needle bar.

Fig. 22 is a diagram of the cam 37 drawn on an enlarged scale.

Fig. 23 is a diagram of one of the cams for causing the needle movement.

The fabric to which my invention refers is of the so-called "full-fashioned" type well known in the art, and which may be made by the well-known Reading machine. My novel fabric is preferably made on a Reading machine, and the drawings illustrate changes which may be made in such machine in order to practice the invention. Other parts of the machine which are well known to those skilled in the art, and which are not necessary to an understanding of the invention, have been omitted for the sake of simplicity.

The fabric constructed according to my invention is one in which it is impossible for a so-called "run" to take place or in which such a run can be limited, depending upon the specific arrangement of stitches.

Figure 1:
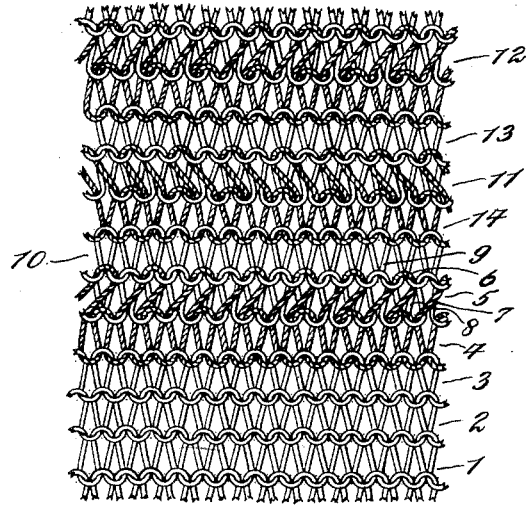

Referring first to Fig. 1, I have shown therein one form of stitch which will prevent formation of a run in a knitted fabric, particularly of the full-fashioned type, although it is to be understood that the same stitch may be used with other types of knitted fabric. In this figure, I have shown a fragment of knitted fabric comprising a series of courses and wales, with each course formed of alternate needle and sinker loops. The courses designated 1, 2, and 3 are plain courses which may be formed in any usual way, and which are shown in this figure by way of contrast with the other courses to be described.

It will be seen that in the course designated 4, each alternate loop towards the upper part of the figure, and which in fact is a needle loop, is extended upwardly and to the right into the course designated 5 and used as a needle loop in that course. For example, the loop designated 6 is formed with the thread 7 and would ordinarily, in the prior art, form a needle loop in the course designated 4. It is, however, carried into the course designated 5 and displaced transversely in that course so as to form part of an adjacent wale and an additional needle loop in the course 5. Its bight or a portion thereof, being laterally displaced or shifted, overlaps with the loop 8 and forms a lock stitch at this point. Assuming that the loop 9 in the next course 10 should break, then the run will at once stop because the loop 6 is offset into an adjacent wale and locked in place there, so that it cannot be released as would be necessary to continue the run.

In the course designated 5, the loops, such as the loop 6, are shown as displaced towards the right, thus changing from one wale to an adjacent wale, whereas in the course designated 11 similar locking loops are shown as being displaced to the left, and then in the course designated 12 the locking loops are again shown as being displaced towards the right. Intermediate the locking zones may be one or more plain courses as desired. As a matter of fact, a short run of one or two courses may not be found undesirable, and therefore the question as to how many courses shall be made with the locking stitches is one largely of choice. For example, in Fig. 1 I have shown a single plain course 10 and a plain course 13, with the two courses 11 and 14 therebetween. These two courses 11 and 14 together form what may be termed a locking zone, and for the best results it is preferable not to have more than one plain course between any two locking zones, although, as just pointed out, this arrangement may be varied as found desirable.

It will also be seen that in the displacing of the loops, such as the loops 6 of Fig. 1, the thread forming these loops passes first under the sinker loops of the course 5, this course 5 being a course of normal loops, and then is deposited upon the thread forming such normal loops in this course. That is to say, the thread forming the displaced loop is passed under a portion of a thread in a course of normal loops and then over another portion of the threads in the same course.

Figure 2:
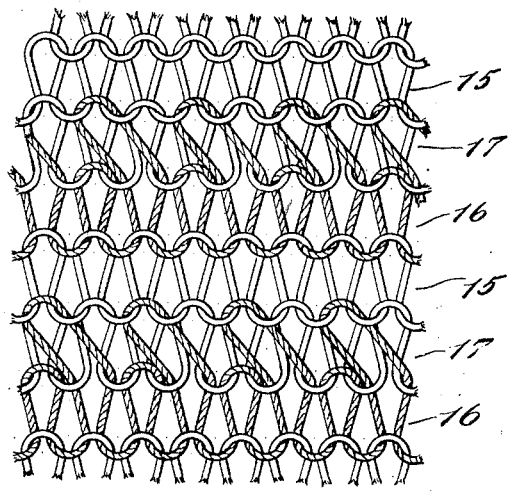

In Fig. 2 I have shown a similar arrangement in which there are provided plain courses 15 separated by courses 16 and 17, which together form a locking zone, this being very much like the arrangement shown in Fig. 1, except that here the displacement of the locking loops is all in one direction.

The term "normal" is herein employed to indicate loops of the plain courses as well as other loops which are not laterally displaced or shifted as herein described.

While I have shown the locking loops as comprising every other loop in a single course, it is possible to use every loop in a course as a locking loop or to have, say, every third or fourth loop as a locking loop. Similarly, the number of loops in a course which are used as locking loops and the number of plain courses between the locking zones may be varied both for economy and to aid in making different designs of fabric. It will be seen that in no wale is there a continuous line of loops, but that there are loops at appropriate intervals that are offset into adjacent wales and locked there, thus positively preventing a run in the wale from which the loop is offset.

Figure 24:
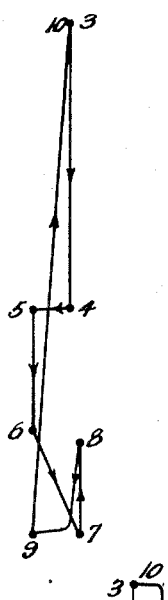
Figs. 24, 25 and 26 are diagrams illustrating the movements of the needles and points.
Figure 25:
Figure 26:

Referring now more particularly to Figs. 3 to 10, inclusive, I will describe the sequence of steps which takes place in forming the fabric described above, and in considering these figures, reference will also be had to Figs. 11, 12, 24, 25 and 26. In Figs. 24, 25 and 26, the various numerals designate points corresponding to Figs. 3 to 10, inclusive, and indicate the positions of the needle and point in each of those figures. Fig. 25 shows the position of a certain point cooperating with the needle whose movement is indicated in Fig. 24, both Figs. 24 and 25 showing the movement of the needle as viewed in the same plane as that in which Figs. 3 to 10 were taken, whereas Fig. 26 shows the movement of a point in a plane at right angles to the aforesaid plane. For example, the numeral 4 in Figs. 24, 25 and 26 indicates the position of the needle and point respectively in Fig. 4.

In Figs. 22 and 23 are shown cams which cause the movement of the point and needle according to the diagrams of Figs. 24 and 25. Fig. 22 is an enlarged diagram of the cam 37 appearing in Fig. 13. In Fig. 13 this cam is shown merely in a diagrammatic way without any attempt to indicate its exact form, whereas Fig. 22 is drawn to show more clearly the relations of the various parts of the cam to each other and to the corresponding parts of the cam operating the needle. Fig. 23 shows the cam 83 for operating the needle in a vertical plane corresponding to the planes indicated in Fig. 3. Legends have been placed on Figs. 22 and 23 indicating the portions of the cam periphery which are in action while the needle and point are in the positions in the various Figures 3 to 10, inclusive. It will not be necessary to repeat the subject matter of these legends herein.

In connection with the showing in Fig. 23 of the needle operating cam 83, the showing is enlarged and is more detailed than in the other figures. Said other figures merely indicate the cam diagrammatically.

The successive positions of the different elements used in forming the stitches and the successive positions of the various threads and the fabric are shown in Figs. 3 to 10, inclusive, wherein the numeral 18 designates a spring-beard needle adapted to catch a thread and pull it through a previously formed loop in a manner well known in the art. The needle shown is one of a row of needles mounted in a needle bar and reciprocated vertically and horizontally by mechanism which is known in the art and which is indicated in Fig. 21.

Associated with the needle are the usual sinker 19 and a divider 20 which are likewise operated by mechanism known in the art and shown in Fig. 21. Associated with the needles, dividers, and sinkers are grooved lock points, which are shown at 21 in the figures being discussed and the operating means for which is shown and will be described further in connection with Figs. 13 to 20, inclusive. For the present, it will suffice to say that the points are arranged to be reciprocated vertically, and horizontally in a plane at right angles to the plane of the drawings, the vertical reciprocation being on the arc of a circle, as will be more fully described later.

Assuming that the parts are in the position shown in Fig. 3, the knitted fabric is leaving the machine in the direction of the arrow and is designated 22. The last row of loops 23 is in position on the knocking-over bits 24 and a new course is being formed with the thread 25, at this stage this thread being formed of sinker loops 26 engaging the sinkers 19 and needle loops 26' engaging the needles 18.

Figure 5:
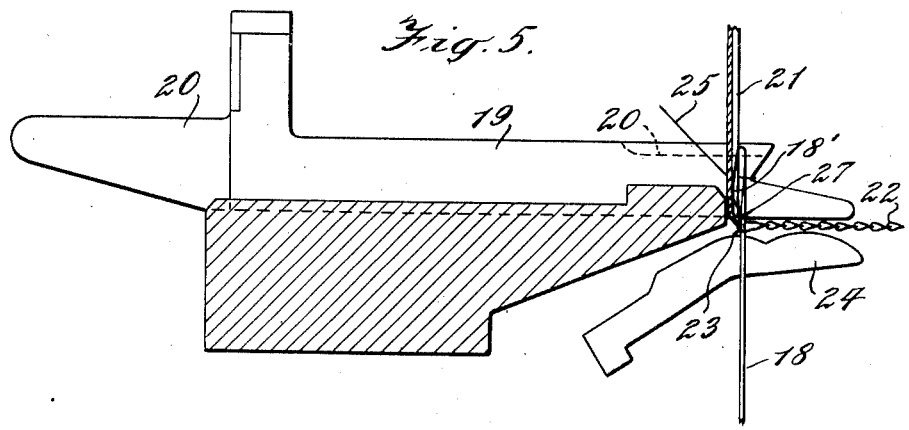
Figure 6:
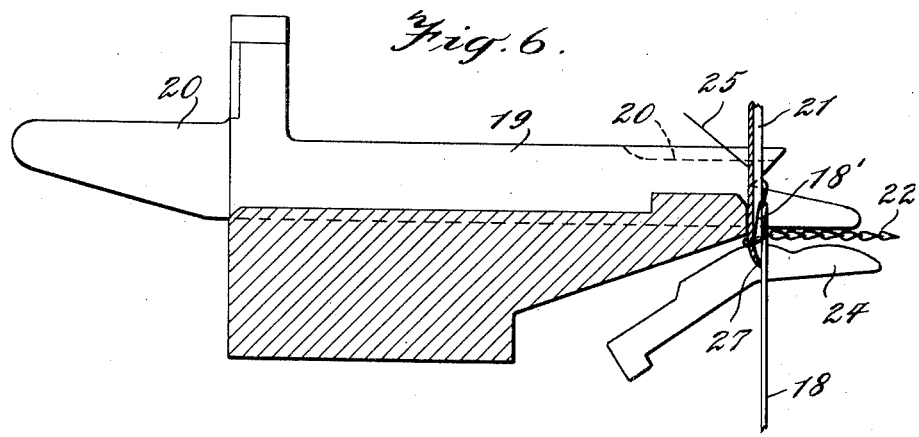
Figure 7:
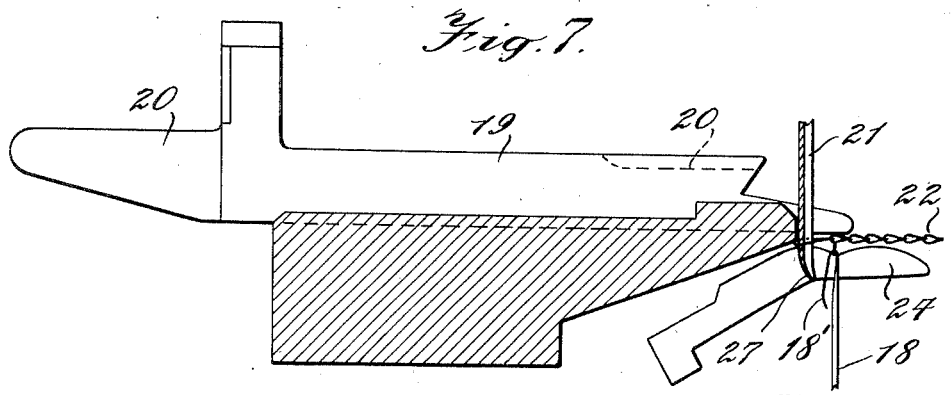

The needles 18 are now moved downwardly, as are also the points 21, and, as shown in Figs. 4 and 11, the beard 18' of the needle engages the new loop 26' to carry it down through a loop 23, in a manner well known in the art. At the same time, the point 21 is moving downwardly at a faster rate of speed than the needle, and receives the beard 18' in its groove as shown in Fig. 5, and the lower end 27 of the point 21 first forces the beard 18' against the shank of the needle and then engages within the loop 23 and pulls it tight as indicated in Fig. 6 and in dotted lines in Fig. 12. The needle bar at the same time is moved backwardly or away to the right as appearing in these figures, and thus helps in forming the loop as just described. The result is that the loop 23 is of a length such that it will extend into the next course of the fabric. The needle continues to move downwardly until it leaves the plane of the fabric as seen in Fig. 7, still carrying with it the thread forming the new loop, and it will be seen in Fig. 7 that the needle is clear of the point.

The point, however, is still in engagement with the bight of the loop 23, and at this stage it is given a movement transversely of the wales, so that at least a portion of the bight of the loop 23 with which the point is engaged will be moved bodily from one existent wale to an adjacent wale, preferably to the next adjacent wale, to the position shown in full lines in Fig. 12. The amount of displacement of a loop 23 by a point is sufficient to bring it into position to be engaged by an adjacent needle and preferably by the next adjacent needle. The operation then proceeds with the needles rising, and the displaced loop 23 will be engaged by an adjacent needle and will then occupy the position shown, for example, by loop 6 in Fig. 1. That is to say, it will be engaged by a new loop corresponding to the loop 9 shown in Fig. 1, and will form a lock loop or thread engaging the loop in the next course. Finally, the parts are returned to the position shown in Fig. 10, which correspond to those shown in Fig. 3, and the operation may be repeated as often as desired to get the correct number of lock stitches needed to prevent running or to form the desired pattern in the fabric.

It will also be noticed that the locking loops 23 are being placed in correct position to perform their locking function at the same time that the next course of loops is being formed from the thread 25. That is to say, a plain course of loops is being formed from the thread 25 simultaneously with the shifting of the locking loops 23.

Referring now to Figs. 13 to 20, inclusive, I have shown the points 21 as mounted on a bar 28, Fig. 15 indicating two such bars disposed adjacent each other for the purpose of knitting separate articles, it being understood that usually a number of articles, such as stockings, are manufactured on one machine at the same time.

A single control may conveniently be used for the parts of the machine forming my invention. As stated above, the points 21 are given a vertical reciprocating movement and a transverse reciprocating movement, and the means for giving the first-named movement will now be described, this means being best shown in Fig. 13.

The bar 28 is fastened to the shaft 29 upon an arm 30, which in turn is secured to a rock shaft 31 mounted in suitable bearings upon the frame of the machine, and this shaft 31 is rocked in order to give the vertical reciprocation of the points 21. The reciprocation is caused by a link 32 connected to the shaft 29 and pivoted at 33 to a rocking arm 34 pivoted at one end at 35 to the frame of the machine, and intermediate its ends carrying a roller 36 adapted to engage a cam 37 on the cam shaft 38. When in the position shown in Fig. 13, the roller engages the cam at its high point 39, which is concentric with the shaft 38 so that passage of the part 39 will not cause actuation of the arm 34. Means to be presently described is provided for releasing the arm 34 so that it may be operated by the cam 37.

Referring now to Figs. 14, 15, and 16, the transverse movement of the points 21 is caused by means of a pattern wheel 40 which may be in the form of a wheel rotating on a shaft 41, and having cam faces on opposite sides thereof cooperating with rollers 42 on a guide 43 slidably mounted on the shaft 29. The guide 43 is provided with ears 44 engaging collars 45 fastened on a shaft 46 slidably mounted for longitudinal movement on the frame of the machine. Secured rigidly to the shaft 46, as by brackets 47, are the bars 28 in which the points are mounted so that movement of the guide 43 along the shaft 29 causes movement of the points 21 an equal amount.

The wheel 40 is rotated intermittently as by a pawl and ratchet arrangement, here shown as comprising a ratchet 48 secured to the shaft 41 so as to rotate with the wheel and operated by a pawl 49 pivoted at 50 to an arm 51 of a bell crank lever secured on a rock shaft 52. The other arm 53 of the lever has at its end a roller 54 engaging a cam 55 on the cam shaft 38. The cam 55 is adapted to intermittently rock the bell crank lever and thus operate the pawl and rotate the ratchet and, consequently, the wheel 40. The pawl is held in yielding engagement with the ratchet as by a spring 56.

When forming plain courses of fabric, the cams 37 and 55 should be inoperative, and, as pointed out above, the roller 36 is held inoperative upon rotation of the cam 37, this being done by a latch 57 engaging a pin 58 on the arm 34. The latch 57 is mounted upon a rock shaft 59 upon which is also secured an arm 60 carrying on its end a roller 61 adapted to engage a cam 62 upon the cam shaft 38. The roller 61 is, however, slidably mounted upon its shaft 61′ which is carried on the end of the arm 60 and, similarly, the roller 54 is slidably mounted on its shaft 54′. These rollers 54 and 61 may be moved on their shafts 54′ and 61′ to a position where they do not engage the cams 55 and 62, respectively, and then means is provided for simultaneously moving them into engagement with those cams.

In Fig. 14 I have shown a forked lever 63 engaging the roller 54 and pivoted on the arm 53 as at 64. Similarly, the roller 61 is engaged by a forked lever 65 pivoted at 66 on the arm 60. Secured to the opposite ends of the levers 63 and 65 is a rod 67 so that movement of this rod 67 will operate both rollers 54 and 61 to bring them into operative relation to the cams 55 and 62, or out of engagement therewith.

The rod 67 may be thus operated by the means shown in Fig. 20, which comprises a rock shaft 68 supported in suitable brackets 69 on the frame of the machine and carrying an arm 70 pivoted to the rod 67. The other end of the rock shaft may carry an arm 71 pivoted to a link 72 which is in turn pivoted to a bell crank lever 73 having at its end a nose 74 disposed in position to be engaged by buttons 75 upon a chain 76 which may be driven by a sprocket 77, which in turn is operated by suitable connections from the cam shaft 38. The buttons are so arranged that the operation of the rod 67 and, consequently, of the cams 55 and 62, will cause movement of the points 21 in synchronism with the needle bar to perform the operations described above.

The wheel 40 forms a pattern wheel which may be varied to obtain any desired arrangement of lock stitches or loops in the knitted fabric, and the buttons 75 on the chain may be varied to control the number of locking zones used in the fabric. The arrangement is thus a very flexible one, as the pattern wheel may be changed at will and the buttons 75 may be made replaceable, as well known in the art. For the sake of convenience, the chain 76 may be the usual narrowing chain employed in machines of this type, and the buttons 75 are in addition to the buttons normally used in the narrowing operation.

The wheel 40 may be easily changed by making it of segments as indicated in Fig. 16, and by holding the segments in place as by pins 78 passing through the ratchet 48 on one side. For help in assembling, and also as a safety provision in operation, I provide on the opposite side of the wheel 40 a second rtachet 79 engaging a pawl 80 urged into engagement with the teeth on the ratchet as by a spring 81. This is a two-way ratchet used to prevent overrunning and also helps to hold the segments of the wheel in place.

Referring now to Fig. 21, I have indicated therein a means for operating the needle bar, sinkers, and dividers. This mechanism will not be described in detail, as it generally follows the usual mechanism for operating these elements in a machine of the Reading type. The needles 18 are mounted in the usual needle bar 82, and the needle bar, sinkers, and dividers are all operated from the cam shaft 38 by the cams 83, 84, and 85. The cams in my machine are varied from the cams ordinarily employed in this type of machine, in order to vary the timing of the needle bar, sinkers, and dividers, but otherwise the connections are closely similar to those usually employed, and therefore a detailed description will not be indulged in.

While I have shown herein a specific form of stitch and specific arrangements of stitches in my novel fabric, and have described and illustrated a selected method and a selected mechanism for practicing that method, it is to be understood that I do not intend to limit myself thereby, as various changes therein may be made without departing from the scope of my invention as defined by the appended claims.

I claim:

1. A non-run knitted fabric formed of courses and wales of loops, with substantially each wale containing a multiplicity of loops each of which has a bight portion thereof displaced from an adjacent existent wale and from an adjacent course, and the courses wherein such displaced loops occur being in such close proximity as to render substantially the entire extent of the fabric of a non-run character, by limiting the breaking effect of any loop of the fabric to a very small number of loops in the wale in which the break occurs.

2. A non-run knitted fabric formed of courses and wales of loops, with substantially each wale containing, in addition to the normal loops of the fabric, a multiplicity of loops each of which has a bight portion thereof displaced from an adjacent existent wale and from an adjacent course, and the courses wherein such displaced loops occur being in such close proximity as to render substantially the entire extent of the fabric of a non-run character, by limiting the breaking effect of any loop of the fabric to a very small number of loops in the wale in which the break occurs.

3. A non-run-knitted fabric formed of courses and wales of loops, with substantially each wale containing, in addition to the normal loops of the fabric, a multiplicity of loops each of which is displaced in its entirety from an adjacent existent wale and from an adjacent course, and the courses wherein such displaced loops occur being in such close proximity as to render substantially the entire extent of the fabric of a non-run character, by limiting the breaking effect of any loop of the fabric to a very small number of loops in the wale in which the break occurs.

4. A non-run knitted fabric formed of courses and wales of loops, with substantially each wale containing, in addition to the normal loops of the fabric, a multiplicity of loops each of which is displaced in its entirety from an adjacent existent wale and from an adjacent course and the bight of which substantially coincides in position with the bight of a normal loop in the wale into which such loop is displaced, and the courses wherein such displaced loops occur being in such close proximity as to render substantially the entire extent of the fabric of a non-run character, by limiting the breaking effect of any loop of the fabric to a very small number of loops in the wale in which the break occurs.

5. A knitted fabric which is substantially of non-run character throughout, said fabric having recurrent throughout its extent a structure characterized by plain courses and by transverse locking zones interposed between said plain courses, each locking zone consisting of two adjacent courses, predetermined loops of one of said two adjacent courses being displaced into an adjacent wale of the other of said two adjacent courses that together constitute a locking zone.

6. A knitted fabric which is substantially of non-run character throughout, said fabric having recurrent throughout its extent a structure characterized by plain courses and by transverse locking zones interposed between said plain courses, each locking zone consisting of two adjoining courses, predetermined loops of one of said two adjoining courses being displaced into an adjacent wale of the other of said two adjoining courses that together constitute a locking zone, such displacement of loops occurring at closely spaced points in substantially all wales of the fabric.

7. That method of rendering a knitted fabric of a substantially non-run character throughout, during the fabrication thereof, which consists in knitting the fabric in course after course of loops, and in substantially every existent wale, in a multiplicity of courses substantially throughout the fabric, laterally shifting predetermined loops each to an adjacent wale in an adjacent course.

8. That method of rendering a knitted fabric of a substantially non-run character throughout, during the fabrication thereof, which consists in knitting the fabric in course after course of loops, and in substantially every existent wale, in a multiplicity of courses substantially throughout the fabric, laterally shifting predetermined loops, each to an adjacent wale in an adjacent course, onto a normal loop in such adjacent wale and course.

9. That method of rendering a knitted fabric of a substantially non-run character throughout, during the fabrication thereof, which consists in knitting the fabric in course after course of loops, and in substantially every existent wale, in a multiplicity of courses substantially throughout the fabric, laterally shifting a bight portion of each of a predetermined number of loops, each to an adjacent wale in an adjacent course.

10. That method of rendering a knitted fabric of a substantially non-run character throughout, during the fabrication thereof, which consists in knitting the fabric in course after course of loops, and in substantially every existent wale, in a multiplicity of courses substantially throughout the fabric, laterally shifting a bight portion of each of a predetermined number of loops, each to an adjacent wale in an adjacent course onto a normal loop in such adjacent wale and course, 11. A non-run knitted fabric formed of courses and wales of loops, with substantially each wale containing a multiplicity of loops each of which has a bight portion thereof from an existent wale laterally displaced from under loops of the next subsequent course of loops into superposed relation onto loops in adjacent wales in the said next subsequent course, and the courses wherein such displaced loops occur being in such close proximity as to render substantially the entire extent of the fabric of a non-run character, by limiting the breaking effect of any loop of the fabric to a very small number of loops in the wale in which the break occurs.

ALFRED GRAENZ.